United States Patent [19]

Evelin

[11] Patent Number: 5,083,195
[45] Date of Patent: Jan. 21, 1992

[54] COLOR DISPLAY CONTROL SYSTEM

[75] Inventor: Graham C. Evelin, Hemel Hempstead, England

[73] Assignee: Crosfield Electronics Limited, London, England

[21] Appl. No.: 366,705

[22] Filed: Jun. 15, 1989

[30] Foreign Application Priority Data

Jun. 21, 1988 [GB] United Kingdom ................. 8814157

[51] Int. Cl.⁵ ...................... H04N 9/64; H04N 17/04; H04N 5/58
[52] U.S. Cl. ....................................... 358/10; 358/29; 358/161
[58] Field of Search ..................... 358/56, 29, 10, 161, 358/27, 28, 64, 60, 139

[56] References Cited

U.S. PATENT DOCUMENTS

| | | |
|---|---|---|
| 3,471,740 | 10/1969 | Dreyfoos, Jr. et al. |
| 3,715,617 | 2/1973 | Tilton et al. |
| 3,962,722 | 6/1976 | Ciciora ................................. 358/10 |
| 3,983,575 | 9/1976 | Nagai et al. ........................ 358/161 |
| 4,001,877 | 1/1977 | Simpson ............................... 358/10 |
| 4,700,218 | 10/1987 | Thomsen et al. ..................... 358/29 |
| 4,706,108 | 11/1987 | Kumagai et al. ..................... 358/29 |
| 4,742,387 | 5/1988 | Oshima ................................ 358/10 |
| 4,746,970 | 5/1988 | Hosokawa et al. ................... 358/56 |

FOREIGN PATENT DOCUMENTS

| | | |
|---|---|---|
| 1462027 | 1/1969 | Fed. Rep. of Germany . |
| 53-4427 | 1/1978 | Japan . |
| 0172495 | 8/1986 | Japan . |
| 158563 | 2/1981 | United Kingdom . |

OTHER PUBLICATIONS

H. Hosokawa et al., "Digital CRT Luminance Uniformity Correction", SID 87 Digest, pp. 412–415.

Primary Examiner—James J. Groody
Assistant Examiner—Michael H. Lee
Attorney, Agent, or Firm—Sughrue, Mion, Zinn, Macpeak & Seas

[57] ABSTRACT

A color display control system for use with a display (1) having a screen (2) capable of being activated so as to generate at least two colors. The system comprises at least one optical sensor (4,5) which detects optical radiation emitted from the display screen (2). A control system (10,11,13) is provided which is responsive to an output signal from the or each sensor (4,5) related to the intensity of the detected radiation to control the optical characteristics of the display so that the detected color is generated in a predetermined manner.

10 Claims, 2 Drawing Sheets

COLOR DISPLAY CONTROL SYSTEM

FIELD OF THE INVENTION

The invention relates to a colour display control system and in particular, a system for controlling the optical characteristics of a visual display.

DESCRIPTION OF THE PRIOR ART

With the use of optical displays in the office environment, where the ambient lighting can change throughout the day, the colour appearance of a display can also change. These changes can be due to flare from the screen which is related to the viewing angle and the ambient light level. Hence, the colour of the display perceived by the operator will change during the day and may also vary from one display to another. The effects of aging on the display will also change the colour perceived by an operator.

A number of prior art systems have attempted to overcome these problems by incorporating an ambient light sensor to control the optical characteristics of the display, for example as disclosed in U.S. Pat. Nos. 4,451,849 and 4,386,345. US-A-3471740 senses the brightness level of a white border area generated by a monochrome cathode ray tube (CRT) while DE-A-1462027 also describes the monitoring of a monochrome CRT. However, these systems do not deal with colour displays and do not automatically compensate for differences between such displays and for the effects of aging on such displays.

SUMMARY OF THE INVENTION

In accordance with the present invention we provide a colour display control system for use with a display having a screen capable of being activated so as to generate at least two colours, the system comprising at least one optical sensor which detects optical radiation emitted from the display screen corresponding to each of the colours generated by the screen, and control means responsive to an output signal form the sensor related to the intensity of the detected radiation to control the optical characteristics of the display so that the detected colour is generated in a predetermined manner.

This invention enables a colour display to be compensated for changes in its optical characteristics and for any changes in the ambient lighting conditions.

By actually measuring the optical radiation emitted from the display corresponding to each activated colour it is possible to automatically adjust any display to give an optimum optical output. Typically the display to be controlled would be a high resolution colour cathode ray tube (CRT) display, although the invention could be used with any other suitable type of display. In a CRT display a number of phosphors are provided on the screen in an array of regions, the phosphors being activatable to generate one of three colours: red, green and blue. The invention enables the individual ageing of one of the phosphors to be determined and corrected without affecting the others.

In should be understood that the reference to activated colours refers to the actual colours generated by the screen (e.g. red, green or blue) and not to the resultant colour perceived by a viewer when a number of individual colours are activated together.

In the preferred example the system comprises two optical sensors, mounted in diagonally opposite corners of the display. Preferably the or each sensor is mounted at a distance of about 2.5 cm to 4 cm away from the surface of the display. Typically, the sensors comprise photo-multiplier tubes but alternatively they could comprise photo-diodes.

In the preferred example the control means causes the display screen to display alternately at least two reference pixels constituting different ones of the said colours to be detected by the sensors. In the preferred embodiment these comprise a red reference pixel, a green reference pixel and a blue reference pixel corresponding to the three phosphors of a CRT. A pixel in this context will comprise the smallest region which can be defined by modulating a display control signal (typically an electron beam) but will consist of a number of different colour phosphor regions.

In general, the control means will control the image signals applied to the display but it would also be feasible to control the ambient light in certain circumstances.

By the term "optical" we mean not only radiation in the optical region of the spectrum but also radiation in the infra-red and ultra-violet regions of the spectrum.

BRIEF DESCRIPTION OF THE DRAWINGS

An example of a display control system in accordance with the present invention will now be described with reference to the accompanying drawings, in which.

EMBODIMENT

Figure 1:
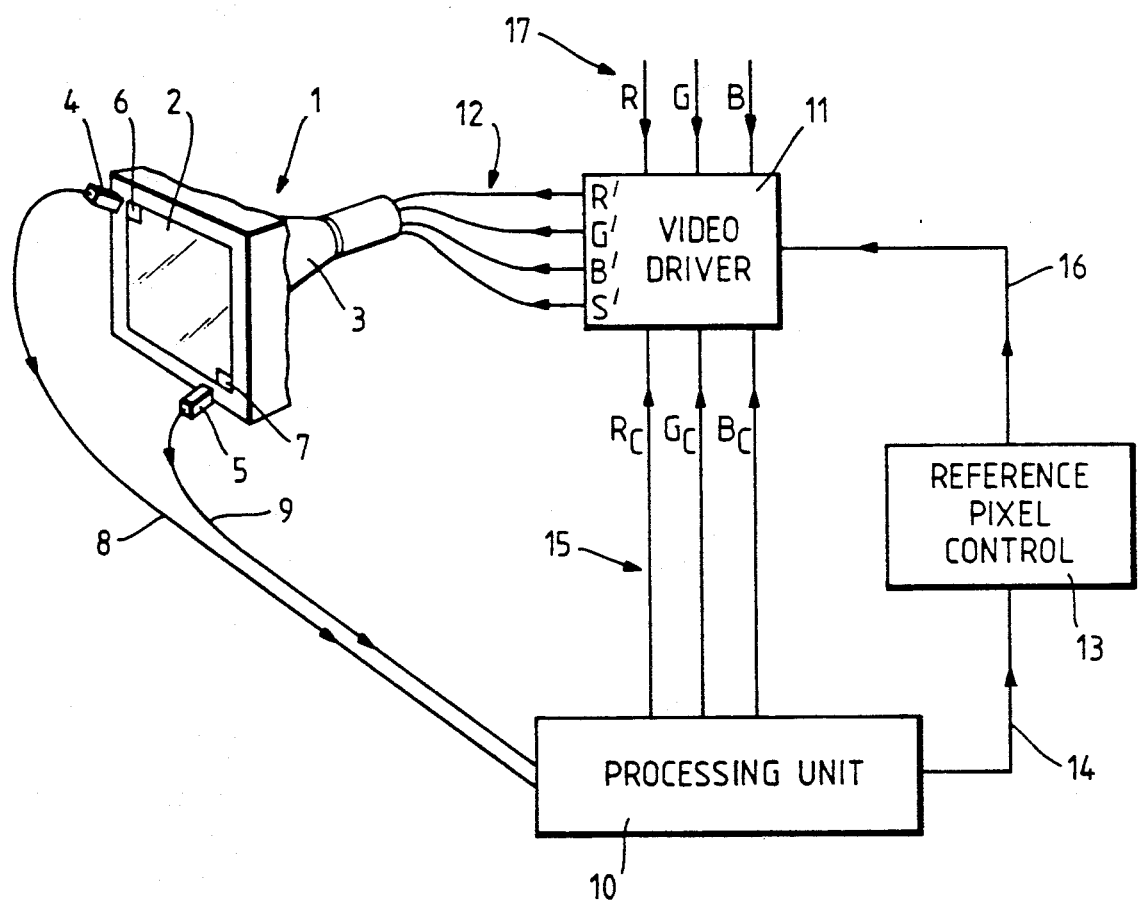
FIG. 1 is a schematic diagram of the display control system.

FIG. 1 shows a display device 1 having a screen 2 which is part of a cathode ray tube 3. Two sensors 4, 5 are positioned at the top left hand corner of the screen and at the bottom right hand corner of the screen respectively so that they sense optical radiation emitted by pixel areas 6, 7. The sensors 4, 5 are positioned at between 2.5 cm and 4 cm from the surface of the screen 2. The output intensity signals 8, 9 from the respective sensors 4, 5 are fed to a processing unit 10 which maintains overall control of the display control system.

A video driver 11 has three input lines 17 on which are received input image colour signals R, G, B. The video driver 11 is connected to the cathode ray tube 3 by four lines 12 which supply colour signals R', G', B' to control the colour of the image produced by the cathode ray tube 3 and a synchronising signal S' necessary for raster control. A reference pixel control unit 13 controls the type of reference pixel which is displayed in the pixel areas 6, 7. The type of reference pixel displayed in the pixel areas 6, 7 may be either a red pixel, a green pixel, or a blue pixel corresponding to the colours of the phosphors on the screen 2. The reference pixel control unit 13 is connected to the processing unit 10 by a line 14. The line 14 is used by the processing unit 10 to transmit to the reference pixel control unit 13 the type of reference pixel to be displayed in the pixel areas 6, 7.

The processing unit 10 is also connected to the video driver 11 directly by means of lines 15, which supply colour correction signals $R_c$, $G_c$, $B_c$ to the video driver 11 which enables the colour control signals R, G, B which are input to the video driver 11 to be modified to output signals R', G', B' which are applied to the cathode ray tube to correct the colour of the display.

In operation, the display unit 1 normally displays an image in a conventional manner as defined by the signals on lines 17. Periodically, the processing unit 10 sends a signal via line 14 to the reference pixel control unit 13. The reference pixel control unit 13 then sends a signal, representative of the type of reference pixel to be displayed, via line 16 to the video driver unit 11. The video driver unit 11 then displays the corresponding reference pixel in the pixel areas 6, 7 on the screen 2 of the cathode ray tube 3 while the remainder of the screen 2 displays the image. The reference pixels are displayed for 1/60 second and will not be seen by the viewer.

The sensors 4, 5 which would typically be photo-multiplier tubes, detect the amplitude of the radiation emitted from the pixel areas 6, 7 and a signal related to the amplitude is transmitted to the processing unit 10 via the lines 8, 9. The processing unit 10 then compares the actual signals from the sensors 4, 5 with a reference value for the particular type of reference pixel which is displayed. (The reference values are set up by generating each reference pixel while the CRT is in darkness and storing the resultant signals from the sensors.) If the signals from the sensors 4, 5 are equal (within acceptable tolerances) to the reference value then that particular colour is set correctly and the processing unit 10 signals the reference pixel control unit 13 via the line 14 to display the next reference pixel.

However, if the signals from the sensors 4, 5 do not correspond with the reference value for the type of reference pixel being displayed then the processing unit 10 calculates a colour correction value $R_c$, $G_c$ or $B_c$. The particular correction value $R_c$, $G_c$ or $B_c$ is then transmitted on the appropriate line 15 to the video driver 11 and the correction signal $R_c$, $G_c$ or $B_c$, is then used to modify the input colour signal R, G or B to the video driver 11 to get a modified output signal R', G' or B', which is applied on the lines 12 to the cathode ray tube 3.

Figure 2:
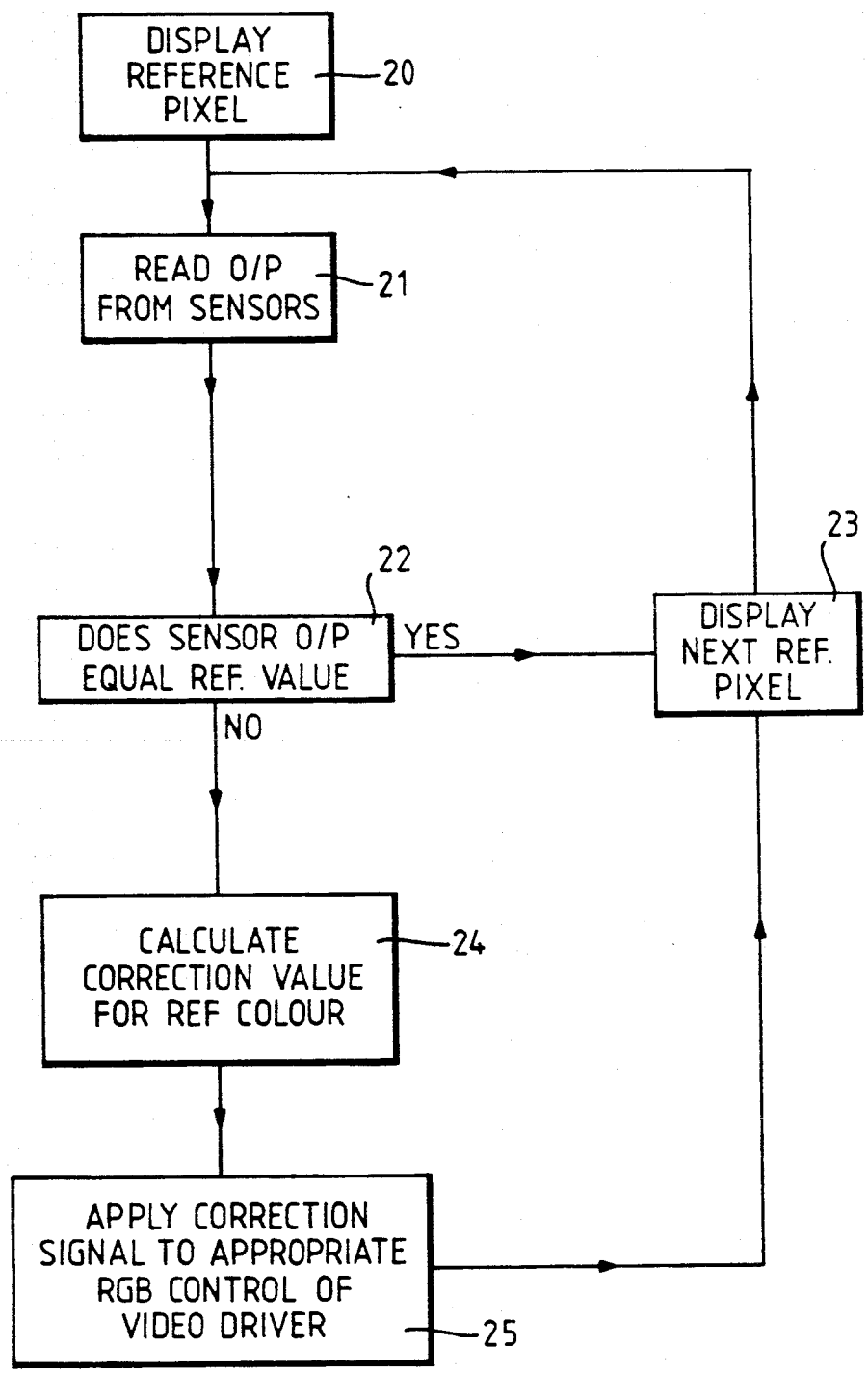
FIG. 2 is a flow diagram illustrating the operation of the display control system shown in FIG. 1.

This method of operation is summarised in FIG. 2. First of all the first reference pixel (e.g. red) is displayed 20 and the processing unit 10 reads 21 the outputs 8, 9 from the sensors 4, 5. The output from the sensors is then compared 22 with the appropriate reference value. If the two values are substantially equal then the next reference pixel (e.g. green) is displayed 23 and the process operation goes back to step 21.

However, if the sensor outputs 8, 9 do not equal the reference value then a correction value for that particular reference colour is calculated 24 and this correction signal is then applied via the appropriate line 25 to the video driver 11. After this has been done the reference pixel control 13 is signalled to display 23 the next reference pixel (e.g. blue), and the process commences again from step 21.

By using the sensors 4, 5 to measure the actual radiation output from the screen 2 which is due to the generated colour and the effects of ambient light it is possible to obtain an automatic display control system which compensates automatically for any changes in both the ambient light level and in the display characteristics. Hence, the colour and tone of the image perceived by the operator can be maintained at a constant value and if the operator changes to a another display unit having the same control system he will still perceive the same colours and tones as he did on the first display unit. This is particularly advantageous with high resolution colour displays which are used in image processing systems because precise colour matching can now be obtained.

It should be understood that this control process is performed during normal operation of the display and would not normally be apparent to the user. The display of reference pixels would occur for a short time and then be repeated periodically.

I claim:

1. A color display control system for use with a display having a screen capable of being activated so as to generate at least two colors, the system comprising at least one optical sensor spaced from the screen for continuously detecting optical radiation emitted from said display screen corresponding to each of said colors generated by said screen, and control means responsive to an output signal from said sensor related to the intensity of the detected radiation to control the optical characteristics of said display in response to changes in ambient lighting conditions so that the detected so that the detected color is generated in a predetermined manner.

2. A system according to claim 1, wherein there are two optical sensors.

3. A system according to claim 2, wherein said two optical sensors are mounted in diagonally opposite corners of said display.

4. A system according to claim 1, wherein said control means causes said display screen to display alternately at least two references pixels constituting different ones of said colours to be detected by said sensors.

5. A system according to claim 4, wherein three reference pixels are alternately displayed.

6. A system according to claim 5, wherein said three reference pixels are a red reference pixel, a green reference pixel and a blue reference pixel.

7. A colour display system comprising a display having a screen capable of being activated so as to generate at least two colours; and a control system comprising at least one optical sensor spaced from the screen for continuously detecting optical radiation emitted from said display screen corresponding to each of said colours generated by said screen, and control means responsive to an output signal from said sensor related to the intensity of the detected radiation to control the optical characteristics of said display in response to changes in ambient lighting conditions so that the detected colour is generated in a predetermined manner.

8. A system according to claim 7, wherein said display is a cathode ray tube.

9. A system according to claim 7, wherein said at least one sensor is mounted at a distance of between substantially 2.5 cm and 4 cm from the surface of said display screen.

10. A method of operating a colour display system comprising a display having a screen capable of being activated so as to generate at least two colours; and a control system comprising at least one optical sensor spaced from the screen for continuously detecting optical radiation emitted from said display screen corresponding to each of said colours generated by said screen, and control means responsive to an output signal from said sensor related to the intensity of the detected radiation to control the optical characteristics of said display so that the detected colour is generated in a predetermined manner, said method comprising controlling said control means periodically to cause a reference pixel to be displayed on said screen, monitoring the resultant emitted radiation detected by said sensor, and controlling said display thereafter so as to compensate for any change in the detected radiation from an expected level based on changes in ambient lighting conditions.

* * * * *